(12) United States Patent
Liu et al.

(10) Patent No.: US 8,245,122 B2
(45) Date of Patent: Aug. 14, 2012

(54) METHOD AND SYSTEM FOR MODELING USER REQUESTS, APPLICATIONS AND COMPONENTS USED IN DYNAMIC APPLICATION ASSEMBLY

(75) Inventors: Zhen Liu, Tarrytown, NY (US); Anton V. Riabov, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 981 days.

(21) Appl. No.: 11/971,068

(22) Filed: Jan. 8, 2008

(65) Prior Publication Data

US 2009/0177955 A1    Jul. 9, 2009

(51) Int. Cl.
*G06F 17/00* (2006.01)

(52) U.S. Cl. ........................................................ 715/200
(58) Field of Classification Search .................. 715/200, 715/255
See application file for complete search history.

(56) References Cited

U.S. PATENT DOCUMENTS

| | | |
|---|---|---|
| 4,571,678 A | 2/1986 | Chaitin |
| 5,187,788 A | 2/1993 | Marmelstein |
| 5,659,754 A | 8/1997 | Grove et al. |
| 5,675,757 A * | 10/1997 | Davidson et al. ............. 712/201 |
| 5,675,805 A | 10/1997 | Boldo et al. |
| 5,696,693 A | 12/1997 | Aubel et al. |
| 5,937,195 A | 8/1999 | Ju et al. |
| 5,999,729 A | 12/1999 | Tabloski, Jr. et al. |
| 6,032,142 A | 2/2000 | Wavish |
| 6,053,951 A | 4/2000 | McDonald et al. |
| 6,339,783 B1 | 1/2002 | Horikiri |
| 6,347,320 B1 | 2/2002 | Christensen et al. |
| 6,430,698 B1 | 8/2002 | Khalil et al. |
| 6,601,112 B1 | 7/2003 | O'Rourke et al. |
| 6,665,863 B1 | 12/2003 | Lord et al. |
| 6,721,747 B2 | 4/2004 | Lipkin |
| 6,792,595 B1 | 9/2004 | Storistenau et al. |
| 6,799,184 B2 | 9/2004 | Bhatt et al. |
| 6,813,587 B2 | 11/2004 | McIntyre et al. |
| 6,891,471 B2 * | 5/2005 | Yuen et al. ............... 340/539.32 |
| 6,983,446 B2 | 1/2006 | Charisius et al. |
| 7,062,762 B2 | 6/2006 | Krishnamurthy et al. |
| 7,103,873 B2 | 9/2006 | Tanner et al. |
| 7,164,422 B1 | 1/2007 | Wholey, III et al. |
| 7,174,536 B1 | 2/2007 | Kothari et al. |
| 7,231,632 B2 | 6/2007 | Harper |
| 7,263,694 B2 | 8/2007 | Clewis et al. |
| 7,290,244 B2 | 10/2007 | Peck et al. |

(Continued)

OTHER PUBLICATIONS

Akkiraju et al., SEMAPLAN: Combining Planning with Semantic Matching to Achieve Web Service Composition, Google 2005, pp. 1-8.*

(Continued)

*Primary Examiner* — Cong-Lac Huynh
(74) *Attorney, Agent, or Firm* — William J. Stock; F. Chau & Associates, LLC

(57) ABSTRACT

A method for determining if a first component can be connected to a second component for inclusion in a processing graph, includes: accessing a first component description, the first component description describing an output object of the first component with a set of tags; accessing a second component description, the second component description describing an input condition of the second component with a set of tags; determining that the first component can be connected to the second component if the set of tags describing the output object includes all tags describing the input condition; and including the first and second connected components in a processing graph if they are connected to each other.

18 Claims, 5 Drawing Sheets

U.S. PATENT DOCUMENTS

| | | | |
|---|---|---|---|
| 7,334,216 B2 | 2/2008 | Molina-Moreno et al. | |
| 7,409,676 B2 | 8/2008 | Agarwal et al. | |
| 7,426,721 B1 | 9/2008 | Saulpaugh et al. | |
| 7,466,810 B1 | 12/2008 | Quon et al. | |
| 7,472,379 B2 | 12/2008 | Chessell et al. | |
| 7,499,906 B2 | 3/2009 | Kloppmann et al. | |
| 7,536,676 B2 | 5/2009 | Baker et al. | |
| 7,543,284 B2 | 6/2009 | Bolton et al. | |
| 7,565,640 B2 | 7/2009 | Shukla et al. | |
| 7,614,041 B2 | 11/2009 | Harper | |
| 7,627,808 B2* | 12/2009 | Blank et al. | 715/200 |
| 7,639,726 B1* | 12/2009 | Sinsuan et al. | 375/130 |
| 7,657,436 B2 | 2/2010 | Elmore et al. | |
| 7,681,177 B2 | 3/2010 | LeTourneau | |
| 7,685,566 B2 | 3/2010 | Brown, Jr. et al. | |
| 7,716,167 B2 | 5/2010 | Colossi et al. | |
| 7,716,199 B2 | 5/2010 | Guha | |
| 7,730,467 B1 | 6/2010 | Hejlsberg et al. | |
| 7,756,855 B2 | 7/2010 | Ismalon | |
| 7,769,747 B2 | 8/2010 | Berg et al. | |
| 7,773,877 B2 | 8/2010 | Yang et al. | |
| 7,792,836 B2 | 9/2010 | Taswell | |
| 7,797,303 B2 | 9/2010 | Roulland et al. | |
| 7,809,801 B1 | 10/2010 | Wang et al. | |
| 7,810,085 B2 | 10/2010 | Shinnar et al. | |
| 7,814,123 B2* | 10/2010 | Nguyen et al. | 707/796 |
| 7,827,210 B2 | 11/2010 | Meliksetian et al. | |
| 7,860,863 B2 | 12/2010 | Bar-Or et al. | |
| 7,861,151 B2* | 12/2010 | Milic-Frayling et al. | 715/205 |
| 7,877,387 B2 | 1/2011 | Hangartner | |
| 7,882,485 B2 | 2/2011 | Feblowitz et al. | |
| 7,886,269 B2 | 2/2011 | Williams et al. | |
| 7,886,273 B2 | 2/2011 | Hinchey et al. | |
| 7,900,201 B1 | 3/2011 | Qureshi et al. | |
| 7,954,090 B1 | 5/2011 | Qureshi et al. | |
| 7,958,148 B2* | 6/2011 | Barnes et al. | 707/783 |
| 7,982,609 B2* | 7/2011 | Padmanabhan et al. | 340/572.1 |
| 7,984,417 B2 | 7/2011 | Ben-Zvi et al. | |
| 7,984,423 B2 | 7/2011 | Kodosky et al. | |
| 7,992,134 B2 | 8/2011 | Hinchey et al. | |
| 8,001,527 B1 | 8/2011 | Qureshi et al. | |
| 8,032,522 B2 | 10/2011 | Goldstein et al. | |
| 8,037,036 B2* | 10/2011 | Blumenau et al. | 707/694 |
| 8,046,737 B2 | 10/2011 | Wittenberg et al. | |
| 8,078,487 B2 | 12/2011 | Li et al. | |
| 8,078,953 B2* | 12/2011 | Kunz et al. | 715/209 |
| 8,086,598 B1 | 12/2011 | Lamb et al. | |
| 8,122,006 B2 | 2/2012 | de Castro Alves et al. | |
| 2002/0109706 A1* | 8/2002 | Lincke et al. | 345/700 |
| 2004/0015783 A1* | 1/2004 | Lennon et al. | 715/523 |
| 2004/0249664 A1* | 12/2004 | Broverman et al. | 705/2 |
| 2005/0096960 A1 | 5/2005 | Plutowski et al. | |
| 2005/0097224 A1 | 5/2005 | Chen et al. | |
| 2005/0125723 A1 | 6/2005 | Srivastava et al. | |
| 2005/0125739 A1 | 6/2005 | Thompson et al. | |
| 2005/0159994 A1 | 7/2005 | Huddleston et al. | |
| 2005/0172306 A1 | 8/2005 | Agarwal et al. | |
| 2005/0177406 A1 | 8/2005 | Facciorusso et al. | |
| 2005/0192870 A1* | 9/2005 | Geddes | 705/26 |
| 2006/0212836 A1 | 9/2006 | Khushraj et al. | |
| 2007/0033590 A1 | 2/2007 | Masuouka et al. | |
| 2007/0043607 A1 | 2/2007 | Howard et al. | |
| 2007/0112777 A1* | 5/2007 | Field et al. | 707/10 |
| 2007/0136281 A1* | 6/2007 | Li et al. | 707/6 |
| 2007/0190499 A1 | 8/2007 | Baur | |
| 2007/0204020 A1 | 8/2007 | Anderson et al. | |
| 2007/0208685 A1* | 9/2007 | Blumenau | 707/1 |
| 2007/0244912 A1* | 10/2007 | Kawaguchi | 707/101 |
| 2007/0245298 A1 | 10/2007 | Grabarnik et al. | |
| 2007/0250331 A1 | 10/2007 | Liu et al. | |
| 2007/0282746 A1 | 12/2007 | Anke et al. | |
| 2008/0065455 A1* | 3/2008 | Sun et al. | 705/8 |
| 2008/0086485 A1* | 4/2008 | Paper | 707/10 |
| 2008/0140778 A1* | 6/2008 | Banavar et al. | 709/205 |
| 2008/0168529 A1 | 7/2008 | Anderson et al. | |
| 2008/0243484 A1* | 10/2008 | Mohri et al. | 704/9 |
| 2009/0070165 A1 | 3/2009 | Baeuerle et al. | |
| 2009/0100407 A1* | 4/2009 | Bouillet et al. | 717/105 |
| 2009/0125366 A1 | 5/2009 | Chakraborty et al. | |
| 2009/0177957 A1* | 7/2009 | Bouillet et al. | 715/230 |
| 2009/0192783 A1* | 7/2009 | Jurach et al. | 704/4 |
| 2009/0249370 A1* | 10/2009 | Liu et al. | 719/330 |
| 2009/0265718 A1* | 10/2009 | Liu et al. | 719/318 |
| 2009/0276753 A1* | 11/2009 | Bouillet et al. | 717/105 |
| 2010/0254435 A1* | 10/2010 | Sinsuan et al. | 375/145 |
| 2010/0293043 A1 | 11/2010 | Atreya et al. | |
| 2011/0078285 A1* | 3/2011 | Hawkins et al. | 709/219 |
| 2011/0107273 A1* | 5/2011 | Ranganathan et al. | 715/854 |

OTHER PUBLICATIONS

Shishagiri et al., A Planner for Composing Services Described in DAML-S, ACM 2003, pp. 1-5.*

Riabov et al., Wishful Search: Interactive Composition of Data Mashups, Google 2008, pp. 775-784.*

Habernal et al., Active Tags for Semantic Analysis, Google 2008, pp. 69-76.*

Rana et al., An XML Based Component Model for Generating Scientific Applications and Performing Large Scale Simulations in a Meta-computing Environment, Google 2000, pp. 210-224.*

Santos-Neto et al., Tracking Usage in Collaborative Tagging Communities, Google 2007, pp. 1-8.*

Li et al. Collaborative Tagging Applications and Approaches, IEEE Sep. 2008, pp. 1-8.*

D. Hinchcliffe, "A bumper crop of new mashup platforms", http://blogs.zdnet.com/Hinchcliffe/?p=111&tag=nl.e622, Jul. 2007.

Navendu Jain, Lisa Amini, Henrique Andrade, Richard King, Yoonho Park, Philippe Selo and Chitra Venkatramani, "Design, Implementation, and Evaluation of the Linear Road Benchmark on the Stream Processing Core", Proceedings of ACM SIGMOD 2006.

Zhen Liu, Anand Ranganathan and Anton Riabov, "A Planning Approach for Message-Oriented Semantic Web Service Composition", in AAAI-2007.

Marti Hearst, Design Recommendations for Hierarchical Faceted Search Interfaces, ACM SIGIR Workshop on Faceted Search, Aug. 2006.

A. Riabov and Z. Liu. Planning for Stream Processing Systems. In AAAI '05, Jul. 2005.

A. Riabov and Z. Liu. Scalable Planning for Distributed Stream Processing Systems. In ICAPS '06, 2006.

E Sirin and B.Parsia. Planning for Semantic Web Services. In Semantic Web Services Workshop at 3rd ISWC, 2004.

K. Whitehouse, F. Zhao and J.Liu. Semantic Streams: a Framework for Composable Semantic Interpretation of Sensor Data. In EWSN '06, 2006.

M. Pistore, P. Traverso, P. Bertoli and A. Marconi. Automated Synthesis of Composite BPEL4WS Web Services. In ICWS, 2005.

Bohannon et al, "Optimizing view queries to ROLEX to support navigable results trees", ACM, pp. 1-12, 2002.

Connor et al, "Key key value stores for efficiently processing graph data in the cloud", IEEE, pp. 88-93, 2011.

Ma et al, "Mining web graphs for recommendations", IEEE, pp. 1-14, 2011.

Jiang et al, "XML RL update language: syntax and semantics", IEEE, pp. 810-816, 2010.

Comito et al, "Selectively based XML query processing in structured peer to peer networks", ACM IDEAS, pp. 236-244, 2010.

Lyritsis et al, "TAGs: Scalable threshold based algorithms for proximity computation in graphs", ADM EDBT, pp. 295-306, 2011.

Narayanan, S., and McIlraith, S. 2002, Simulation, verification and automated composition of web services, in WWW '02.

M. Traverso, P., and Pistore, M. 2004, Automated composition of semantic web services into executable processes, in ISWC '04.

Baird, R.; Hepner, M.; Jorgenson, N.; Gamble, R., "Automating Preference and Change in Workflows," Seventh International Conference on Composition-Based Software Systems (Feb. 25-29, 2008), pp. 184-193 [retrieved http://ieeexplore.ieee.org/stamp/stamp.jsp?tp=&arnumber=4464023&isnumber=4463987].

Pistore, M.; Barbon, F.; Bertoli, P.; Shaparau, D.; Traverso, P., "Planning and Monitoring Web Service Composition" (2004), AIMSA 2004, LNAI 3192, pp. 106-115 [retrieved from http://www.springerlink.com/content/21nucbh4rrjfk8av/fulltextpdf].

Peer, J., "Web Service Composition As AI Planning—A Survey", (2005) [retrieved from http://decsai.ugr.es/~faro/CDoctorado/bibliografia/refPlanning4SW/LinkedDocuments/webservice-composition-as-aiplanning-pfwsc.pdf].

Hepner, M., "Dynamic Changes to Workflow instances of Web Services," (2007), University of Tulsa, [retrieved from http://www.seat.utulsa.edu/papers/Hepner07-Dissertation.pdf].

A. Stentz, The Focused D* Algorithm for Real-Time Replanning (IJCAI-1995).

Heinlein, C. "Workflow and Process Synchronization with Interaction Expressions and Graphs", 2001, IEEE, p. 243-252.

Xie et al., "An additive reliability model for the analysis of modular software failure data", Oct. 24, 1995 IEEE, p. 188-193.

Groen et al., "Reliability data collection and analysis system", Aug. 24, 2004, IEEE, p. 43-48.

Camilo Rostoker, Alan Wagner, Holger Hoos, "A Parallel Workflow for Real-time Correlation and Clustering of High-Frequency Stock Market Data", (Mar. 26-30, 2007), Parallel and Distributed Processing Symposium, 2007, IPDPS 2007. IEEE International pp. 1-10 [retrieved from http://ieeexplore.ieee.org/stamp/stamp.jsp?tp=&arnumber=4227944&isnumber=4227918].

* cited by examiner

```
<flow>
<flowInput name="SearchQuery"/>
<call name="yAnswers" class="com.example.URLBuilder">
<input name="prefix"
value="http://answers.yahoo.com/rss/searchq"/>
<input name="suffix" link="SearchQuery"/> </call>
<call name="yNews"class="com.example.URLBuilder">
<input name="prefix"
value="http://news.search.yahoo.com/news/rss"/>
<input name="suffix" link="SearchQuery"/> </call>
<call name="fetchNews" class="com.example.FetchFeed">
<input name="url" link="yNews"/> </call>
<call name="fetchAnswers" class="com.example.FetchFeed">
<input name="url" link="yAnswers"/> </call>
<call name="truncNews" class="com.example.Truncate">
<input name+"feed" link="fetchNews"/> </call>
<call name="truncAnswers" class="com.example.Truncate">
<input name="feed" link="fetchAnswers"/> </call>
<call name="union" class="com.example.Union">
<input name="feed1" link="truncAnswers"/>
<input name="feed2" link="truncNews"/> </call>
<call name="sort" class="com.example.Sort">
<input name="feed" link="union"/> </call>
<flowOutput link="sort"/>
</flow>
```

FIG. 3

```
tag {_URL-_Format}
tag {_Feed-_Format}
tag {_Source-_StickyTag}
tag {FrontPage-_Source}
tag {Opinion-_Source}
tag {Travel-_Source}
tag {News-_Source}
tag {Newspaper-News}
tag {Blog-_Source}
tag {NewYorkTimes-Newspaper}
tag {NYTFrontPage-NewYorkTimes FrontPage}
tag {Yahoo-_Source}
tag {TruncatedFeed-_FeedLength}
tag {FullFeed-_FeedLength}
tag {InForeignLanguage-_Language}
tag {InEnglish-_Language}
tag {InFrench-InForeignLanguage}
tag {Sorted-_SortOrder}
tag {_NotSorted-_SortOrder}
tag {NaturalOrder-_NotSorted}
tag {Unsorted-_NotSorted}
```

FIG. 4

METHOD AND SYSTEM FOR MODELING USER REQUESTS, APPLICATIONS AND COMPONENTS USED IN DYNAMIC APPLICATION ASSEMBLY

RELATED APPLICATIONS

This application is related to commonly assigned U.S. application Ser. No. 11/872,385, filed Oct. 15, 2007, commonly assigned U.S. application Ser. No. 11/970,262, filed Jan. 7, 2008, and commonly assigned U.S. application entitled, "METHOD OF RECOVERING FROM SOFTWARE FAILURES USING REPLANNING", Ser. No. 11/971,056, filed concurrently herewith, the disclosures of which are all incorporated by reference herein in their entirety.

BACKGROUND OF THE INVENTION

1. Technical Field

The present invention relates to modeling components for application assembly, and more particularly, to modeling components for application assembly with tags.

2. Discussion of the Related Art

Configurable applications for automating the processing of syndication feeds (i.e., Atom and RSS) are gaining increasing interest and attention on the Web. As of this writing, there are over 30,000 customized feed processing flows (referred to as "pipes") published on Yahoo Pipes, the most popular service of this kind. Yahoo Pipes offers hosted feed processing and provides a rich set of user-configurable processing modules, which extends beyond the typical syndication tools and includes advanced text analytics such as language translation and keyword extraction. The Yahoo Pipes service also comes with a visual editor for flows of services and feeds. In the example of FIG. 1, the feeds are Yahoo Answers and Yahoo News, which can be parameterized and truncated, while union and sort are services. There exist similar frameworks that are provided as a hosted service (e.g., IBM DAMIA) or as downloadable server-side software (e.g., /n software's RSS-Bus, IBM Mashup Starter Kit and IBM Project Zero).

Automatic service discovery and composition is one of the promises of Service Oriented Architecture (SOA) that is hard to achieve in practice. Currently, composition is done with graphical tools by manually selecting services and establishing their interactions. Business Process Execution Language (BPEL)-WS language has been developed to describe composite services. However, describing composite services using BPEL-WS is tedious and requires extensive knowledge of the services being composed.

Automatic composition work has been focusing on composition using simple compatibility constraints, as well as semantic descriptions of services, such as Ontology Web Language (OWL)-S. The drawback of these approaches is that they do not provide an easy way of interacting with the composer/user. For example, even if the user is goal-oriented and does not require knowledge of the services, the user must be familiar with the ontology that was used to describe services. In addition, it is difficult for novice users to create goal specifications, since that involves studying the ontology to learn the terms the system uses. Further, the ontology does not automatically provide a method for verifying the requests. Hence, users do not have any guidance from the system that could help in specifying requests. This turns service composition into a tedious trial and error process.

Similarly to how programs can be composed of operators and functions, composite services describe service invocations and other lower-level constructs. Composite services are processing graphs composed of smaller service components. A service component can be an invocation of an existing service, an external data input (e.g., a user-specified parameter or data source), a data processor operator (e.g., an arithmetic operator), or another (smaller) composite service specified as a processing graph of service components.

While many execution environments include tools that assist users in defining composite services, these tools typically require a detailed definition of the processing flow, including all service components and communication between the components. One example of this type of tool is IBM WebSphere Studio.

In contrast, methods such as planning can be used to automatically compose new composite services based on a high level input provided by the user. Automatic composition methods require less knowledge about the service components and in general only require the user to specify the composition goal in application domain terms.

For the purposes of automatic composition, in many scenarios the service components can be described in terms of their data effects and preconditions. In particular, we assume that a description (such as WSDL or Java object code with optional metadata annotations) of each service component specifies the input requirements of the service component (such as data type, semantics, access control labels, etc.). We refer to these input requirements as preconditions of service invocation, or simply preconditions. The description also specifies the effects of the service, describing the outputs of the service, including information such as data type, semantics, etc. In general, a component description may describe outputs as a function of inputs, so that the description of the output can only be fully determined once the specific inputs of the component have been determined. Note that in practical implementations the invocations can be synchronous, such as subrouting or RPC calls, or asynchronous, such as asynchronous procedure calls or message exchange or message flow.

Under these assumptions, an automated planner can then be used to automatically assemble processing graphs based on a user-provided description of the desired output of the application. The descriptions of the components are provided to the planner in the form of a domain description. The planner can also take into account the specification of available primal inputs to the workflow, if not all inputs are available for a particular planning request.

The planner composes a workflow by connecting components, starting from the primal inputs. It evaluates possible combinations of components, by computing descriptions of component outputs, and comparing them to preconditions of components connected to the output. More than one component input can be connected to one component output or one primal input. Logically, this amounts to sending multiple copies of data produced by the component output, with one copy sent to each of the inputs. In practical implementation these do not have to be copies, and it is possible to pass data by reference instead of by value. The process terminates when an output of a component (or a set of outputs taken together) satisfies the condition specified in the user requirement. Note that all conditions are evaluated at plan time, before any applications are deployed or executed.

If multiple alternative compositional applications can be constructed and shown to satisfy the same request, the planner may use heuristics and utility functions to rank the alternatives and select the highest ranked plans.

The application, once composed, is deployed in an execution environment and can be executed one or more times.

Examples of a planner and an execution environment are described in Zhen Liu, Anand Ranganathan and Anton Riabov, "A Planning Approach for Message-Oriented Semantic Web Service Composition", in AAAI-2007.

Similar work has been done in the contexts of Stream Processing, Web Services and Grid Computing.

Work has been done on automatic goal-driven composition in the past, especially within the AI planning and semantic web communities. Some of this work uses ontologies and associated standards such as OWL-S to describe components used in composition. See E. Sirin and B. Parsia. Planning for Semantic Web Services. In Semantic Web Services Workshop at $3^{rd}$ ISWC, 2004.

Other works use process models or transition systems. See M. Pistore, P. Traverso, P. Bertoli, and A. Marconi. Automated synthesis of composite BPEL4WS web service. In ICWS, 2005.

Work has also been done using a formalism called Stream Processing Planning Language (SPPL) for stream processing and ontology-based semantic web service composition. See A. Riabov and Z. Liu. Planning for stream processing systems. In AAAI'05, July 2005, A. Riabov and Z. Liu. Scalable planning for distributed stream processing systems. In ICAPS'06, 2006, and Z. Liu, A. Ranganathan, and A. Riabov. A planning approach for message-oriented semantic web service composition. In AAAI'07, 2007.

A formalism that is similar in expressivity to SPPL, and in certain aspects exceeds it, has been proposed in Semantic Streams system, K. Whitehouse, F. Zhao, and J. Liu. Semantic streams: A framework for composable semantic interpretation of sensor data. In EWSN'06, 2006, which allows user to pose queries based on the semantics of sensor data.

SUMMARY OF THE INVENTION

In an exemplary embodiment of the present invention, a method for determining if a first component can be connected to a second component for inclusion in a processing graph, comprises: accessing a first component description, the first component description describing an output object of the first component with a set of tags; accessing a second component description, the second component description describing an input condition of the second component with a set of tags; determining that the first component can be connected to the second component if the set of tags describing the output object includes all tags describing the input condition; and including the first and second connected components in a processing graph if they are connected to each other.

The output object of the first component is described by specifying tags that can be added to or removed from the description of the object when the object is output from the first component. The input condition of the second component is described by specifying a tag query that must be satisfied by an object provided to the second component as an input.

The tag query is a set of tags selected from a list of tags, the tags in the list having a predefined sub-tag relationship. The tag query is satisfied if the set of tags describing the output object of the first component includes a sub-tag for each tag describing the input condition of the second component.

Information is propagated from an input port of the second component to an output port of the second component by using a typed tag variable bound to one of the tags describing the output object of the first component and using the typed tag variable to describe an object to be output from the output port of the second component.

Information is propagated from the input port of the second component to an output port of the second component by defining a sticky tag as a label for automatically propagating tags, wherein if a sub-tag of the sticky tag appears in a description of the output object of the first component, the sticky tag is added to the description of an object to be output from the output port of the second component.

In an exemplary embodiment of the present invention, a method for application assembly, comprises: receiving a tag query that specifies a goal; and composing a processing graph that satisfies the goal, wherein the processing graph satisfies the goal if an object output by a component in the processing graph satisfies the tag query, the processing graph being composed by: accessing a plurality of component descriptions, a first component description describing an output object of the first component with a set of tags and a second component description describing an input condition of the second component with a tag query; determining that the first component can be connected to the second component if the set of tags describing the output object satisfies the tag query describing the input condition; and inserting the first and second components into the processing graph if they are connected to each other.

The tag query that specifies the goal is selected by a user from a list of tags presented to the user on a computer screen.

The component descriptions are accessed from a memory, the component descriptions being created by software developers.

In an exemplary embodiment of the present invention, a computer readable medium tangibly embodying a program of instructions executable by a processor to perform method steps for determining if a first component can be connected to a second component for inclusion in a processing graph, the method steps comprising: accessing a first component description, the first component description describing an output object of the first component with a set of tags; accessing a second component description, the second component description describing an input condition of the second component with a set of tags; determining that the first component can be connected to the second component if the set of tags describing the output object includes all tags describing the input condition; and including the first and second connected components in a processing graph if they are connected to each other.

The output object of the first component is described by specifying tags that can be added to or removed from the description of the object when the object is output from the first component. The input condition of the second component is described by specifying a tag query that must be satisfied by an object provided to the second component as an input.

The tag query is a set of tags selected from a list of tags, the tags in the list having a predefined sub-tag relationship. The tag query is satisfied if the set of tags describing the output object of the first component includes a sub-tag for each tag describing the input condition of the second component.

Information is propagated from an input port of the second component to an output port of the second component by using a typed tag variable bound to one of the tags describing the output object of the first component and using the typed tag variable to describe an object to be output from the output port of the second component.

Information is propagated from the input port of the second component to an output port of the second component by defining a sticky tag as a label for automatically propagating tags, wherein if a sub-tag of the sticky tag appears in a description of the output object of the first component, the sticky tag is added to the description of an object to be output from the output port of the second component.

In an exemplary embodiment of the present invention, a computer readable medium tangibly embodying a program of instructions executable by a processor to perform method steps for application assembly, the method steps comprising: receiving a tag query that specifies a goal; and composing a processing graph that satisfies the goal, wherein the processing graph satisfies the goal if an object output by a component in the processing graph satisfies the tag query, the processing graph being composed by: accessing a plurality of component descriptions, a first component description describing an output object of the first component with a set of tags and a second component description describing an input condition of the second component with a tag query; determining that the first component can be connected to the second component if the set of tags describing the output object satisfies the tag query describing the input condition; and inserting the first and second components into the processing graph if they are connected to each other.

The tag query that specifies the goal is selected by a user from a list of tags presented to the user on a computer screen.

The component descriptions are accessed from a memory, the component descriptions being created by software developers.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

BRIEF DESCRIPTION OF THE DRAWINGS

FIG. 3 is a flow description according to an exemplary embodiment of the present invention;

FIG. 4 is a fragment of a tag taxonomy according to an exemplary embodiment of the present invention.

DETAILED DESCRIPTION OF EXEMPLARY EMBODIMENTS

Figure 1:
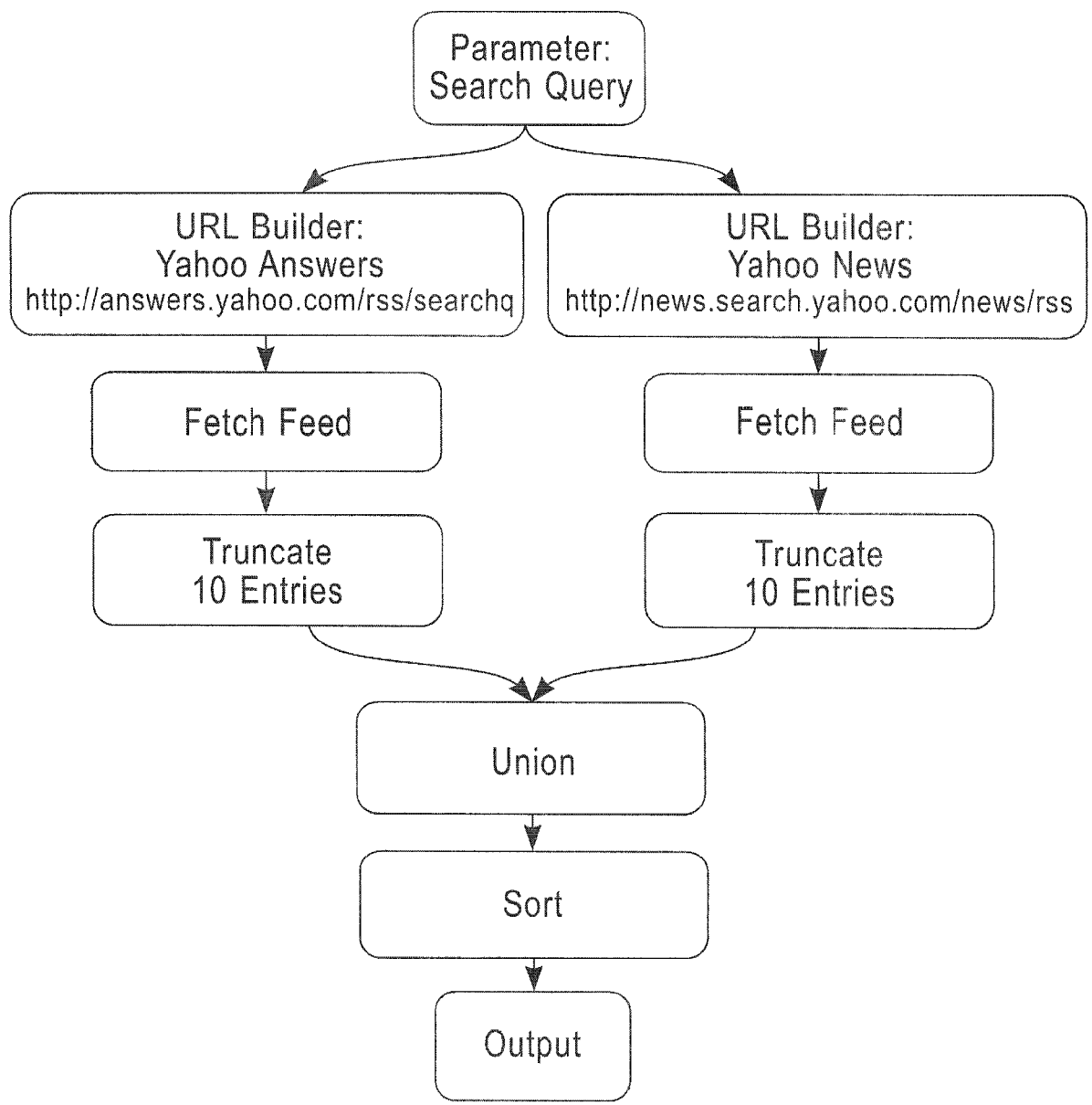
FIG. 1 is an example of a flow of feeds and services.

To support iterative refinement of queries, an embodiment of the present invention extends tag-based search with the use of tag taxonomies. Searching for a tag corresponding to a high-level category in a taxonomy returns results tagged with sub-category tags.

Our invention does not require the taxonomies to be specified explicitly in a top-down fashion. Instead, taxonomies can emerge implicitly in a bottom-up process that is typical of folksonomies. Nevertheless, our search mechanism allows an explicitly defined taxonomy of tags, or a set of such taxonomies, to be added at any time to enhance the search.

The use of tag taxonomies together with context-dependent query refinement controls implements an intuitive iterative goal specification process, where the goals are expressed as general categories at first, and are subsequently refined to more specific tags as necessary. On the other hand, it does not prevent users from jumping to specific tags directly, effectively shortcutting the iterations.

Recognizing the difficulties associated with obtaining detailed unambiguous descriptions of service semantics, we have taken an approach that relies on light-weight semantic metadata annotations by making use of tags, folksonomies and simple taxonomies to describe the semantics of services, feeds and flows. Given these simple annotations, our invention uses a small set of rules to compute a set of tags that describes each potentially composable flow.

The use of tag-based descriptions greatly simplifies this task compared to heavier ontology-based approaches proposed in prior work. Descriptions of feeds can be obtained, for example, from social bookmarking web sites like Syndic8.com. The descriptions of services, however, may require slightly more careful and consistent design. As we show in this disclosure, this is not an obstacle in practice, especially in applications where the set of services is small compared to the set of feeds.

The invention provides the following: 1) an easy to follow methodology for describing application components for the purposes of planning; 2) a method for computing an easily understandable plan description based on component descriptions; 3) a method for computing an easily understandable description of system capabilities provided to the user as an assistance in specifying requests for composition; and 4) a method for specifying requests for composition compatible with the previous 3 items.

The key to the added simplicity is the use of simple and intuitively understandable tag-based annotations that can originate in a folksonomy and the use of taxonomies to simplify goal selection and refinement. The system relies on annotations specified on components and sources. These annotations are specified using tags (in a form described below) by people or generated from various available metadata using an automatic process, such as keyword extraction, web crawling, etc.

The invention introduces a translation between a new description language and the previously developed SPPL language described in commonly assigned U.S. application Ser. No. 11/406,002 filed Apr. 18, 2007, and A. Riabov and Z. Liu. Planning for stream processing systems. In AAAI'05, July 2005, copies of which are incorporated by reference herein in their entirety. Minor extensions have been made to SPPL to support this new description language.

An automatic composer is described in detail in commonly assigned U.S. application Ser. No. 11/872,385, filed Oct. 15, 2007.

Figure 2:
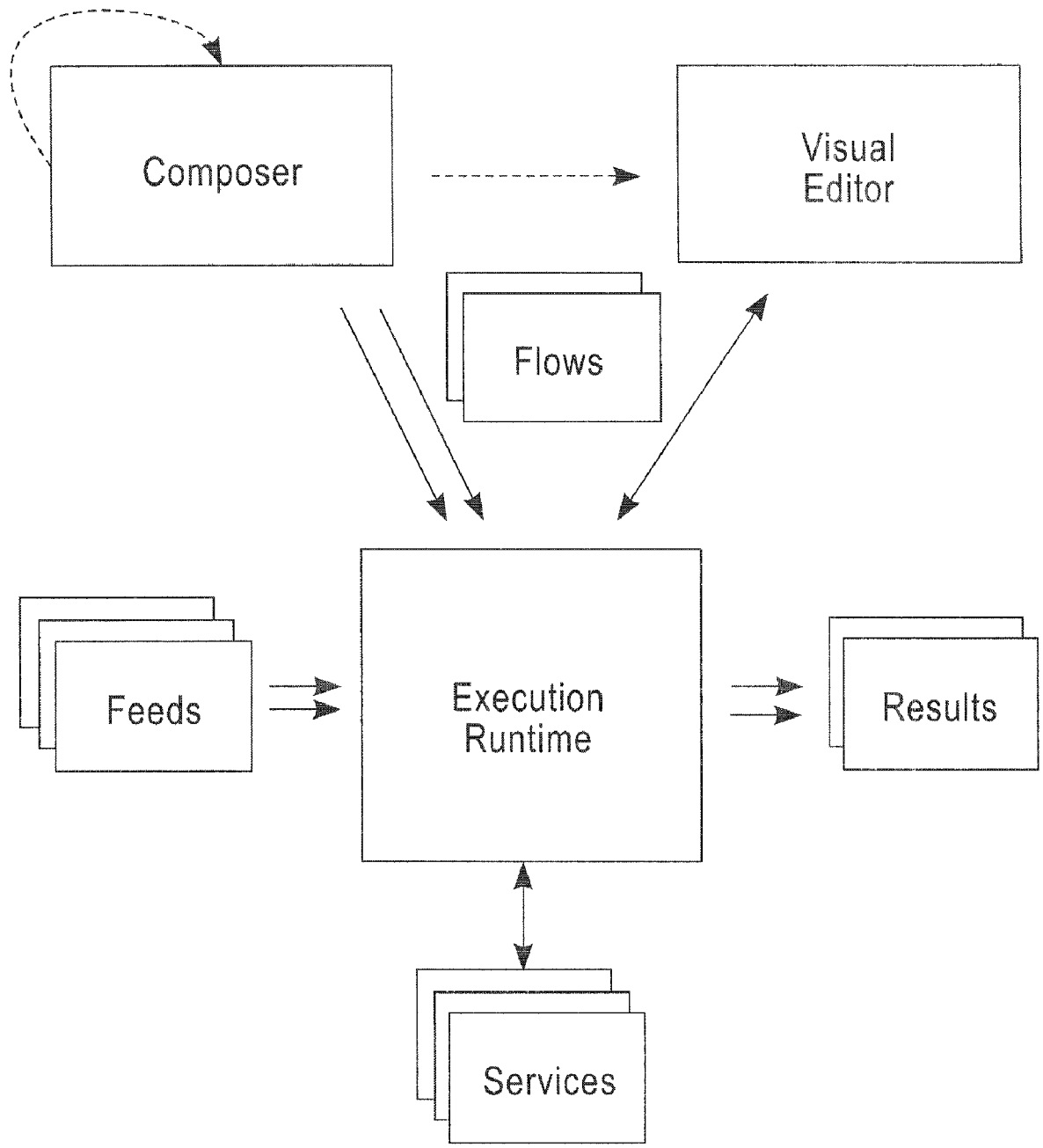
FIG. 2 illustrates the interaction of a composer with other systems according to an exemplary embodiment of the present invention.

FIG. 2 shows a high-level overview of the interaction between systems that can be triggered through a user interface that is used to communicate with the composer. An end user interacts with the composer to create a flow. The flow is deployed to an execution runtime. The runtime executes the flow by calling services to process feeds and produce results. In practice, the processing can be activated by a Web service request sent to the runtime, and the runtime can respond with results represented as a feed, similarly to Yahoo Pipes. A visual editor, if one is available, can be invoked to edit the composed flow. To open the flow to the composer, the editor can retrieve a flow definition directly from the runtime, or obtain it from the composer.

Abstract Model

First, we will give the formal definition of the compositional semantics of a flow. We address this by defining a model for deriving the semantic description of a flow based on the descriptions of its individual components. A key characteristic of our model is that it captures not only the semantics of inputs and outputs, but also the functional dependency between the outputs and the inputs. This model can also be expressed using SPPL formalism introduced in A. Riabov and Z. Liu. Planning for stream processing systems. In AAAI'05, July 2005, for describing planning tasks, which allows us to use an efficient planning algorithm for flow composition.

Composition Elements

Objects, Tags and Taxonomies

A taxonomy $T=\{t\}$ is a set of tags (i.e., keywords) t. An object o is described by a set of tags $d(o) \subseteq T$ selected from the taxonomy T. An object can be, for example, a resource bookmark, as in del.icio.us, or a feed, as in Syndic8.com.

In the simplest case, for example if T is formed as a folksonomy, by people specifying one or more tags to describe certain objects, the tags in T are unrelated and T is completely unstructured. Introducing a taxonomy structure in T, however, enhances query expressivity, as we will explain below, and helps keep tag-based descriptions succinct. The structure of the taxonomy is described by specifying a sub-tag relationship between tags. The following definition is the standard definition of a taxonomy sub-tag relation applied to tagging.

Definition 1. A tag $t1 \in T$ is a sub-tag of $t2 \in T$, denoted $t1::t2$, if all objects described by $t1$ can also be described by $t2$. The sub-tag relation is transitive, i.e., if $t1::t2$ and $t2::t3$ implies $t1::t3$ for $\forall t1, t2, t3 \in T$.

For example, NewYorkTimes:: Newspaper. For notational convenience we will further assume that each tag is a sub-tag of itself, i.e., $\cup t \in T$, $t::t$.

If two tags $t1, t2 \in T$ are such that $t1::t2$ and $t2::t1$, these tags are synonyms, since by definition they describe the same set of objects. We will denote this as $t1 \equiv t2$.

Queries

Queries are used to describe the desired results produced by a composition (i.e., composition goals), or to specify the input conditions of an operator.

Definition 2. A tag query $q \subseteq T$ selects a subset $Q_q(O)$ of an object set $O=\{o\}$ such that each object in the selected subset is described by all tags in q, taking into account sub-tag relationships between tags. Formally, $Q_q(O) = \{o \in O | \forall t \in q \exists t' \in d(o)$ such that $t'::t\}$.

Note that this definition of a query remains equally effective in configurations with implicit taxonomies, where the sub-tag relationships are not stated explicitly, as well in cases where taxonomies have explicitly stated sub-tag relationships.

For example, consider a set of objects O1 and a taxonomy T1 where NewYorkTimes:: Newspaper, and some objects in O1 are annotated with NewYorkTimes. Assume that O2 is created from O1 by explicitly annotating every object in the set $\{o \in O1 | \{NewYorkTimes\} \subseteq d(o)\}$ with Newspaper tag, and taxonomy T2 is the same as T1 but with the sub-tag relationship between Newspaper and NewYorkTimes removed (thus defining an implicit taxonomy). As a result, for q={Newspaper} the selected subset will be the same in both sets of objects.

This is an important property of the proposed approach. It allows mixing implicit taxonomies, typical of folksonomy-like bottom-up modeling approaches, with much more structured and elaborate top-down modeling, which is typical of taxonomies and ontologies. By effectively enabling an easy gradual transition from implicitly defined to explicitly stated sub-tag relationships between tags, as the model evolves, it greatly reduces the effort required for creating a first working set of descriptions compared to the top-down ontology-based modeling approaches, where the significant cost of defining taxonomies must be paid upfront.

Operators

An operator is a basic unit in the composition. Generally, it creates one or more new objects from a subset of existing objects. An operator can require no inputs. When one or more inputs are required, an input condition is specified for each input. The input condition is specified as a tag query, which must be satisfied by the corresponding object provided as input. The outputs are described by specifying tags that are added to and removed from the description of the new objects produced by the output.

The descriptions of the new objects functionally depend on descriptions of input objects. There are two methods of propagating information from the input to the output. The first, explicit, method involves using a typed tag variable that can be bound to one of the tags describing the input object, and then using this variable to describe one or more of the outputs. Note this method can generally be used only to propagate tags of types that are known when the operator is described. In certain cases, however, it is desirable to propagate tags of types that emerge after the operator has been described. To enable the second method of propagation, a special "sticky" tag $\Omega$ is defined to serve as a label for automatically propagating tags. If any sub-tag of $\Omega$ appears in at least one input object description, it will be automatically added to the description of all output objects.

The following definition captures the properties of an operator explained above.

Let $p(f) \geq 0$ be the number of operator variables for operator f;

$\vec{t}(f) = \{t_k(f) | t_k(f) \in T\}_{k=1}^{p(f)}$ be an array of tags representing the tag classes of operator variables $\vec{v}$ for operator f;

$n(f) \geq 0$ be the number of inputs of operator f;

$\vec{q}(f, \vec{v}) = \{q_i(f, \vec{v}) | q_i(f, \vec{v}) \subseteq T\}_{i=1}^{n(f)}$ be an array of tag queries that define input conditions of operator f;

$\dot{m}(f) \geq 1$ be the number of outputs of operator f;

$\vec{a}(f, \vec{v}) = \{a_j(f, \vec{v}) | a_j(f, \vec{v}) \subseteq T\}_{j=1}^{m(f)}$ be an array of sets of added tags for outputs of operator f;

$\vec{r}(f, \vec{v}) = \{r_j(f, \vec{v}) | r_j(f, \vec{v}) \subseteq T\}_{j=1}^{m(f)}$ be an array of sets of removed tags for outputs of operator f;

Given the above parameters of an operator, and an object set O;

an array of tags $\vec{v} = \{v_k\}_{k=1}^{p(f)}$ assigned to operator variables, such that $v_k \in T$ and $v_k::t_k(f)$;

an array of input objects $\vec{o} \subseteq O$ satisfying the input conditions parameterized with $\vec{v}$, i.e., such that $\vec{o} = \{o_i\}_{i=1}^{n(f)}$ and $o_i \in Q_{qi(f, \vec{v})}(O)$ we define the operator as follows.

Definition 3. Operator $f = (p, \vec{t}, n, \vec{q}, m, \vec{a}, \vec{r})$ is a function on the object set, defined as $f(O, \vec{v}, \vec{o}) = O \cup O'$, where $O' = \{o'_j | o'_j \notin O\}_{j=1}^{m(f)}$ is the set of new objects produced by the operator, and where $$d(o'_j) = \left[ \bigcup_{i=1}^{n(f)} \{t' \in d(o_i) | t' :: \Omega\} \right] \cup a_j(f, \vec{v}) \setminus r_j(f, \vec{v}).$$

The definition above provides a formula for computing descriptions of new objects produced by the operator: the description of each object is the union of automatically propagated tags derived from $\Omega$ and operator-output-specific added tags, minus the set of operator-output-specific removed tags.

Composition

Composition Semantics

A composition of operators is defined simply as the result of applying one operator to the object set produced by another operator.

Definition 4. The composition of $l$ operator instances formed by operators $f_1, f_2, \ldots f_l$ applied to object subsets $\vec{o_1}, \vec{o_2}, \ldots, \vec{o_l}$ and parameterized with tags $\vec{v_1}, \vec{v_2}, \ldots, \vec{v_l}$ correspondingly is the composite operator $f = \circ f_j$, $j = 1 \ldots l$ defined as $$f(O) = f_l(\ldots(f_2(f_1(O,\vec{v_1},\vec{o_1}),\vec{v_2},\vec{o_2})),\vec{v_l},\vec{o_l}).$$

Notice that $f(O) = O \cup O'_1 \cup O'_2 \ldots \cup O'_l$, where $O'_j$ is the set of new objects produced by operator $f_j$. Also note that input objects for each subsequent operator can be selected from the object set produced by the preceding operator, i.e., $$\vec{o_1} \subseteq O_0 \equiv O$$

$$\vec{o_2} \subseteq O_1 \equiv O \cup O'_1$$

$$\ldots$$

$$\vec{o_l} \subseteq O_{l-1} \equiv O \cup O'_1 \cup O'_2 \cup \ldots \cup O'_{l-1}$$

Definition 5. The composition is valid when the input conditions of each operator instance $f_j$ are satisfied by the object array $\vec{o_j}$, i.e., $\forall i, \text{jo}_{ji} \in Q_{qj_i(f_j, \vec{v_j})}(O_{j-1})$.

Subsequent instances of operators may use objects produced by preceding operators as inputs, i.e., there could exist $i$ and $j$, $i < j$ such that $o_j \cap O'_i \neq \emptyset$. In other words, there is a data dependency between $o_j$ and $o_i$. Data dependencies between operator instances within a composition can be represented using a data dependency graph where arcs connect operator outputs to inputs of other operators. Note that under this model the directed data dependence graphs will always be acyclic.

Goal Driven Composition

The problem of goal-driven composition can now be defined as the problem of finding a composition of operators that produces an object satisfying a given query. As an additional simplifying assumption, we assume that the composition is applied to an empty object set. This assumption is not significantly constraining, since the initial objects can always be produced by operators that do not require any input objects. On the other hand, the assumption allows uniform modeling of both feeds and services as operators.

Given a composition problem $P(T, F, g)$, where:

T is a tag taxonomy, $F = \{f\}$ is a set of operators, g is a composition goal specified as a tag query, $g \subseteq T$, the solution set is defined as follows.

Definition 6. The set of solutions $S(T, F, g)$ to the goal-driven composition problem $P(T, F, g)$ is the set of all valid compositions F of operators in F such that $Q_g(F(\emptyset)) \neq \emptyset$;

for all operator instances in F, at least one object produced by this instance serves as input to another operator instance, or satisfies the goal query.

The second condition in the definition above helps eliminate from consideration inefficient compositions that have dead-end operator instances producing unused objects.

Composition Ranking

Before the set of compositions $S(T, F, g)$ can be presented to the user, the compositions must be ranked, with those most likely to satisfy a user's intent appearing first in the list. The ranking is based on a heuristic metric reflecting composition quality. Each operator $f \in F$ is assigned a fixed cost $c(f)$. Cost of an operator instance in a composition is equal to the cost of the corresponding operator.

Definition 7. Rank $\text{rank}(\hat{f})$ of the composition $$\hat{f}(O) = f_n(\ldots(f_2(f_1(O))\ldots)$$

is the sum of the costs of operator instances, i.e., $$\text{rank}(\hat{f}) = \sum_{i=1}^{n} c(f_i).$$

By default for all operators $c(f) = 1$. Hence, the best compositions are the shortest ones. During configuration of the system, the number can be left equal to the default, or configured for some operators to reflect feed or service quality.

Goal Refinement Tag Cloud

The refinement tag cloud provides valuable help to the user in refining the goal. The tag cloud is simply a popularity-weighted set of tags computed over the descriptions of outputs of all compositions in a solution set $S(T, F, g)$. In theory, if the goal g is empty, the tag cloud is computed over all valid compositions. Although the set of all compositions may indeed be very large, the set of compositions with differently described outputs is much smaller. The SPPL planner can compute the tag cloud without constructing all compositions.

Note that the queries in our model behave as though the super-tags from the taxonomy are always included in the object description with corresponding sub-tags. The same approach should be used during tag cloud computation. Even if the super-tags are not included in object description explicitly, they are added to the description automatically for the purposes of computing the weights in the tag cloud. This ensures that even if certain tags do not accumulate enough weight to appear in the visible portion of the tag cloud, they add weight to their super-tags, and will still be accessible through those super-tags.

Application Example

In this section we describe how the abstract formalism described in the previous section is applied in practice to descriptions of components.

Execution Runtime

As one embodiment, the execution environment can be a simple Java-based runtime. Each service in this runtime implements interface Service with a single public method named process that receives and returns a hashmap containing input and output object values:

```
interface Service {
    Map<String,Object> process(Map<String,Object> inputs);
}
```

The set of hashmap keys used to identify input and output objects in the input and output hashmaps is specific to each service. A separate description is provided to specify the hashmap keys recognized by the service, as well as tag-based annotations on inputs and outputs. This description is then used to construct a description of an operator. Service implementation invokes external web services for sophisticated processing, such as language translation, when necessary.

A simple XML format is used to define a flow and deploy it in the runtime. Once deployed, the flow can be called with user-defined values of parameters, and will produce results. FIG. 3 presents a sample description corresponding to the flow shown on FIG. 1.

A flow definition consists of flow inputs (i.e., external parameters), calls (i.e., operator instances) and a flow output. The call elements instruct runtime about the Java classes to be used to process data, and the input objects to be included in the input map. The objects can be specified as string values by specifying value attribute, or linked to outputs of other calls by specifying a link. In the example of FIG. 3, each output map contains just one element, so specifying the name of the call is sufficient to describe a link. Otherwise, for operators that produce more than one object, "callName.element-Name" notation is used as a means of resolving potential ambiguity.

Descriptions

The automatic composer requires descriptions of services, feeds, parameters, and taxonomies. These descriptions are translated into operators and other elements of the abstract model described earlier, which is then used by the planner to generate flows. All descriptions can be specified in one file or broken into multiple files, which are then automatically combined into one logical file before processing.

Tag Taxonomies

Taxonomies are described by specifying sub-tag relationships between tags. A tag does not need to be explicitly declared before it is used, but a tag{ } statement is necessary to declare parents of a tag, which follow after '-', for example:
tag {NYTFrontPage-NewYorkTimes FrontPage}.

Tag names beginning with underscore "_" are hidden tags that are never displayed in a user interface, but otherwise behave as normal tags. Hidden tags can be used to express composition constraints that are internal to the system, for example, type constraints. The special tag Ω is represented as _StickyTag. FIG. 4 shows an example tag taxonomy.

Feed Descriptions

In the example of a feed description below, the output annotation uses tags to describe the content of the feed, as well as its language.

```
feed NYTFrontPage {
output{ NYTFrontPage InEnglish _URL }
url {http://www.nytimes.com/services/xml/rss/nyt/HomePage.xml}
}
```

Such descriptions can be generated automatically, for example using Syndic8 tags and default values for language. The description is translated into an operator that has no inputs, and produces a single output object tagged with all tags used in output annotation. If this operator is included in a flow composed by the planner, during flow execution the runtime will bind the corresponding operator instance to a built-in service that returns the URL string as a single entry in the hashmap of output objects.

Service Descriptions

Each service can have a number of inputs and outputs. A service description is directly translated into an operator that requires and produces a corresponding number of objects. For example, the following describes a FetchFeed service.

```
service FetchFeed {
java {com.example.FetchFeed}
var {?lang - _Language}
input[url]{ ?lang _URL }
```

-continued

```
output{?lang FullFeed NaturalOrder _Feed Text}
}
```

This description uses a variable named ?lang of type _Language, and declares an input and an output. The output list of tags is treated as a list of added tags by default. However, tags preceded with ~ are interpreted as removed tags.

Note that sub-tags of_Language are not sticky (i.e., are not derived from the special tag represented as _StickyTag), and therefore must be propagated explicitly from input to output using a variable. However, if the FetchFeed operator is applied to the output of the feed operator in the example above, NYTFrontPage tag will be propagated to the output of FetchFeed as well, since that tag is sticky according to the taxonomy in FIG. 4.

Each input and output in the description can have a port name specified in square brackets. In this example, only the input has a port name "url". The port name is the name of the entry in the hashmap that is used to carry the corresponding input or output object. Since there is only one output port, the runtime does not need to know the name of the output object. Finally, the java description element specifies the name of the Java class that implements the service.

Flow Parameters and Constants

Flows that take external parameters can also be composed using the same framework. When two or more services within a flow are parametric, the planner can decide whether to expose the service parameters as one input parameter of the flow, or as several separate parameters. This is achieved by using tags to describe service input parameters (as inputs to services), and representing parameter values similarly to feeds, i.e., as operators that produce a single object described by tags. The following is an example of service description that has an external parameter.

```
param Destination {
default{London}
output{_SearchQuery Travel}
}
service YNewsSearchURL {
java {com.example.URLBuilder}
input[prefix]{"http://news.search.yahoo.com/news/rss"}
input[suffix]{_SearchQuery}
output{_URL YahooNews InEnglish}
}
```

Service YNewsSearchURL has two inputs, but the corresponding operator will have only one input. The constant string in quotes is used to initialize the prefix parameter to a constant. In the plan, suffix parameter will be connected to the object produced by the operator corresponding to Destination service. Note that including constants into the description makes it possible to specify different semantic descriptions for different configurations of the same service.

More Service Description Examples

The following examples from the sample application further illustrate different services that can be described in this model.

```
service Truncate10 {
java {com.example.Truncate}
var {?lang - _Language}
```

```
var {?sort - __SortOrder}
input[feed]{__Feed ?lang FullFeed ?sort}
input[length]{"10"}
output{__Feed ?lang ShortFeed ?sort}
}
service TranslateEnFr {
java {com.example.Translate}
var {?len - __FeedLength}
input[feed]{__Feed InEnglish ?len NaturalOrder}
input[fromLanguage]{"en"}
input[toLanguage]{"fr"}
output{__Feed InFrench ?len NaturalOrder}
}
service Union2 {
java {com.example.UnionOfTwoFeeds}
var {?lang - __Language}
var {?len - __FeedLength}
input[feed1]{__Feed ?lang NaturalOrder ?len}
input[feed2]{__Feed ?lang NaturalOrder ?len}
output{__Feed ?lang ?len Unsorted}
}
```

These descriptions describe the services in the application shown in FIG. 1. In addition to the goal shown in FIG. 1, the application supports a set of interesting goals, such as NewYorkTimes InFrench, Technology News ByDate, NewYorkTimes Flickr Image, etc.

Implementation of a Planner with the Provided Descriptions.

In one embodiment, planning (i.e., application composition for user-specified request) can be accomplished by translating the request and the set of tag and component descriptions into SPPL language, and providing as input to an SPPL planner, such as that described in A. Riabov and Z. Liu. Planning for stream processing systems. In AAAI'05, July 2005. Then, the plans produced by the SPPL planner can be trivially translated into compositional applications and deployed in execution environment.

SPPL representation has been described in commonly assigned U.S. application Ser. No. 11/406,002 filed Apr. 18, 2007.

The semantic model naturally maps to SPPL formalism, which describes the planning domain as a set of actions that can be composed by the planner. The set of actions is created based on the set of operators. Action preconditions, described by predicates, are created based on operator input conditions. Tags are represented as types in SPPL, and preconditions are specified using a variable of the corresponding type. Action effects are mapped to operator outputs. An SPPL predicate propagation mechanism is used for propagation of sticky and regular tags.

Possible Extensions i) Complex metadata. A component description can be combined with any metadata stored with a component, for example metadata required to deploy a component.

ii) Hidden tags. Tags can be omitted from tag clouds based on a naming convention. For example, if tag name starts with a special symbol, e.g. underscore "_", the convention can state that such tags are hidden, i.e., never shown to the user in tag clouds. This also means that in most cases such tags should be used with non-hidden tags. The purpose of hidden tags is to specify input-output matching constraints that are not supported by regular tags.

iii) Modular declaration. It is possible that different components and different tags are declared in different documents (e.g., different files). Then, an additional pre-processor stage can be added to the planning process, which first gathers the various declarations, and then compiles then into SPPL domain.

iv) Namespaces. Tag naming can be extended to include namespace information, which helps resolve naming ambiguities, especially in modular declaration scenarios, where the same tag can be used in different modules with different meanings. Disambiguation is achieved by declaring each tag in a namespace, and requesting user input (i.e. selecting specific namespace) when disambiguation is required for a tag specified in user request.

v) Ontologies. Taxonomies can be imported from RDFS or OWL, for example by adding "import {filename.owl}" statement to the language. In this case, URIs in RDFS or OWL must be mapped to tags. Simple rewriting rules, dictionaries and/or namespace-based disambiguation approaches can be used to present URIs to a user in a readable way.

vi) Multiple output goals. The described approach assumes that user requests a single output at a time. In practice, it is easy to extend the approach to specify more than one output to be matched by a plan.

vii) Component weights. A weight (floating point number) can be specified on each component with a statement like "weight {5.0}" inside component definition. These weights are then used in ranking the plans—the plan with the lower value of the sum of weights of all components is assigned the highest rank and is more likely to be shown to the user and deployed when multiple alternative plans exist.

Figure 5:
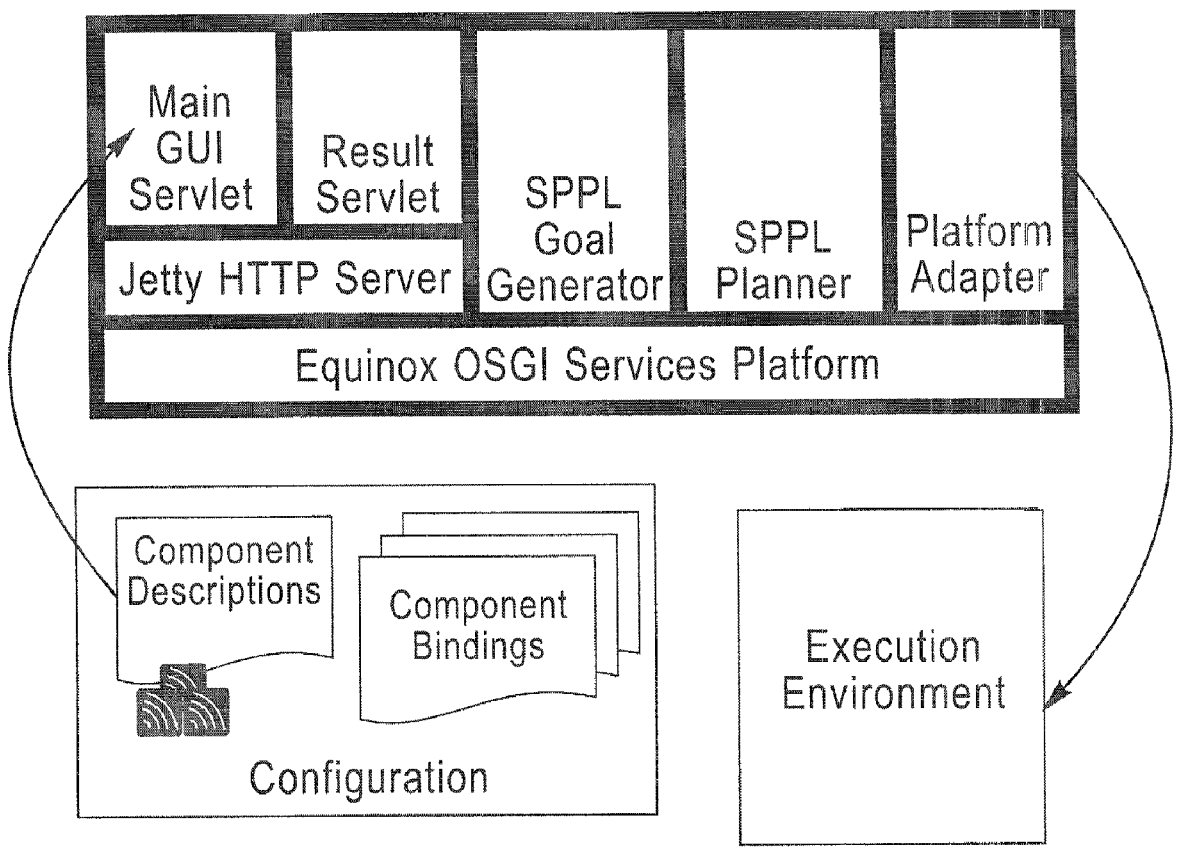
FIG. 5 illustrates the architecture of a system according to an exemplary embodiment of the present invention.

FIG. 5 shows an example architecture of the system. The system consists of several modules implemented as OSGi services deployed on an Eclipse Equinox (http://www.eclipse.org/equinox/) implementation of an OSGi platform (http://www2.osgi/org/Specifications/HomePage#Release 4). The GUI is implemented by two servlets, the Main GUI Servlet that generates a user interaction screen and the Results Servlet that generates a "preview of results".

Jetty web server (http://jetty.mortbay.com/), integrated with OSGI platform, is used to host the servlets. SPPL Goal Generator service generates SPPL goal descriptions based on a user-specified set of tags submitted via the Main GUI Servlet.

SPPL Planner service invokes an SPPL planner to process the generated goal and generate a processing graph. Examples of a planner and an execution environment are described in Zhen Liu, Anand Ranganathan and Anton Riabov, "A Planning Approach for Message-Oriented Semantic Web Service Composition", in AAAI-2007, the disclosure of which is incorporated by reference herein in its entirety.

The Platform Adapter service translates the processing graph produced by the SPPL planner to the format recognized by the target execution environment. The Platform Adapter service can also include procedures for deploying the translated processing graph in the target execution environment, for invoking the deployed processing graph and retrieving results of its execution, and for generating a preview of results received from the processing graph.

The system is configured by providing descriptions of all service components and primal data, and optionally a set of component bindings. The component bindings are files used by the platform adapter to generate a platform-specific representation of the processing graph. The component bindings are typically represented as templates, with one template provided for each component, with placeholders that are filled in by the platform adapter to represent connections between components in generated processing graphs.

The invention described above proposes a method for simplifying service composition and making it accessible to end users, who are familiar with the application domain, but are not necessarily familiar with the set of services that can be composed. The invention enables an intuitively understandable user interface that composes the service based on a minimum required specification, and provides assistance when creating such a specification.

In particular, the invention provides system capability information to the user to indicate which requests can be processed. The invention also provides a preview of the plan (i.e., application) produced for the request in terms that are familiar to the user, which can help the user understand whether a request should be refined. Further, by making the writing of component descriptions a simple task, the invention significantly reduces upfront effort required to start using an automated planner. This contributes to significantly increased consumability of planner-based solutions.

It is understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It is also understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It is further understood that the above description is only representative of illustrative embodiments. For convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for determining if a first component can be connected to a second component for inclusion in a processing graph, comprising:
    accessing a first component description, the first component description describing an output object of the first component with a set of tags;
    accessing a second component description, the second component description describing an input condition of the second component with a set of tags;
    determining that the first component can be connected to the second component if the set of tags describing the output object includes all tags describing the input condition; and
    including the first and second connected components in a processing graph if they are connected to each other,
    wherein information is propagated from an input port of the second component to an output port of the second component by defining a sticky tag as a label for automatically propagating tags, wherein if a sub-tag of the sticky tag appears in a description of the output object of the first component, the sticky tag is added to the description of an object to be output from the output port of the second component.

2. The method of claim 1, wherein the output object of the first component is described by specifying tags that can be added to or removed from the description of the object when the object is output from the first component.

3. The method of claim 2, wherein the input condition of the second component is described by specifying a tag query that must be satisfied by an object provided to the second component as an input.

4. The method of claim 3, wherein the tag query is a set of tags selected from a list of tags, the tags in the list having a predefined sub-tag relationship.

5. The method of claim 4, wherein the tag query is satisfied if the set of tags describing the output object of the first component includes a sub-tag for each tag describing the input condition of the second component.

6. The method of claim 4, wherein information is propagated from an input port of the second component to an output port of the second component by using a typed tag variable bound to one of the tags describing the output object of the first component and using the typed tag variable to describe an object to be output from the output port of the second component.

7. A method for application assembly, comprising:
    receiving a tag query that specifies a goal; and
    composing a processing graph that satisfies the goal, wherein the processing graph satisfies the goal if an object output by a component in the processing graph satisfies the tag query, the processing graph being composed by:
        accessing a plurality of component descriptions, a first component description describing an output object of the first component with a set of tags and a second component description describing an input condition of the second component with a tag query;
        determining that the first component can be connected to the second component if the set of tags describing the output object satisfies the tag query describing the input condition; and
        inserting the first and second components into the processing graph if they are connected to each other,
    wherein if a first tag is not described by the output object of the first component and the first tag is output from the first component, the first tag is permitted to propagate through the second component if it is related to a sticky tag included in the input condition of the second component.

8. The method of claim 7, wherein the tag query that specifies the goal is selected by a user from a list of tags presented to the user on a computer screen.

9. The method of claim 7, wherein the component descriptions are accessed from a memory, the component descriptions being created by software developers.

10. A computer readable medium tangibly embodying a program of instructions executable by a processor to perform method steps for determining if a first component can be connected to a second component for inclusion in a processing graph, the method steps comprising:

accessing a first component description, the first component description describing an output object of the first component with a set of tags;

accessing a second component description, the second component description describing an input condition of the second component with a set of tags;

determining that the first component can be connected to the second component if the set of tags describing the output object includes all tags describing the input condition; and including the first and second connected components in a processing graph if they are connected to each other, wherein information is propagated from an input port of the second component to an output port of the second component by defining a sticky tag as a label for automatically propagating tags, wherein if a sub-tag of the sticky tag appears in a description of the output object of the first component, the sticky tag is added to the description of an object to be output from the output port of the second component.

11. The computer readable medium of claim 10, wherein the output object of the first component is described by specifying tags that can be added to or removed from the description of the object when the object is output from the first component.

12. The computer readable medium of claim 11, wherein the input condition of the second component is described by specifying a tag query that must be satisfied by an object provided to the second component as an input.

13. The computer readable medium of claim 12, wherein the tag query is a set of tags selected from a list of tags, the tags in the list having a predefined sub-tag relationship.

14. The computer readable medium of claim 13, wherein the tag query is satisfied if the set of tags describing the output object of the first component includes a sub-tag for each tag describing the input condition of the second component.

15. The computer readable medium of claim 13, wherein information is propagated from an input port of the second component to an output port of the second component by using a typed tag variable bound to one of the tags describing the output object of the first component and using the typed tag variable to describe an object to be output from the output port of the second component.

16. A computer readable medium tangibly embodying a program of instructions executable by a processor to perform method steps for application assembly, the method steps comprising:

receiving a tag query that specifies a goal; and composing a processing graph that satisfies the goal, wherein the processing graph satisfies the goal if an object output by a component in the processing graph satisfies the tag query, the processing graph being composed by:

accessing a plurality of component descriptions, a first component description describing an output object of the first component with a set of tags and a second component description describing an input condition of the second component with a tag query;

determining that the first component can be connected to the second component if the set of tags describing the output object satisfies the tag query describing the input condition; and inserting the first and second components into the processing graph if they are connected to each other, wherein if a first tag is not described by the output object of the first component and the first tag is output from the first component, the first tag is permitted to propagate through the second component if it is related to a sticky tag included in the input condition of the second component.

17. The computer readable medium of claim 16, wherein the tag query that specifies the goal is selected by a user from a list of tags presented to the user on a computer screen.

18. The computer readable medium of claim 16, wherein the component descriptions are accessed from a memory, the component descriptions being created by software developers.

* * * * *